April 13, 1954
G. JENDRASSIK
2,675,173
APPARATUS EFFECTING PRESSURE EXCHANGE
Filed Feb. 28, 1948
3 Sheets-Sheet 1
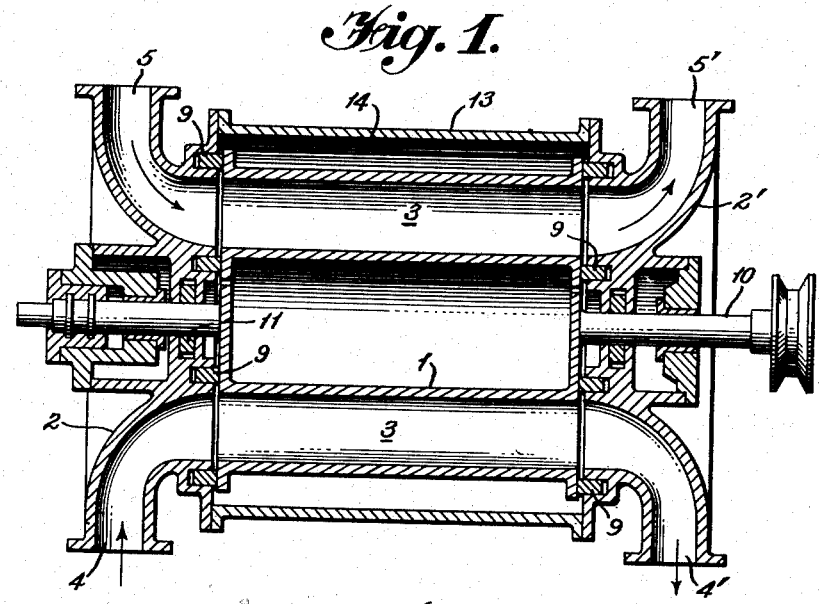
Fig. 1.
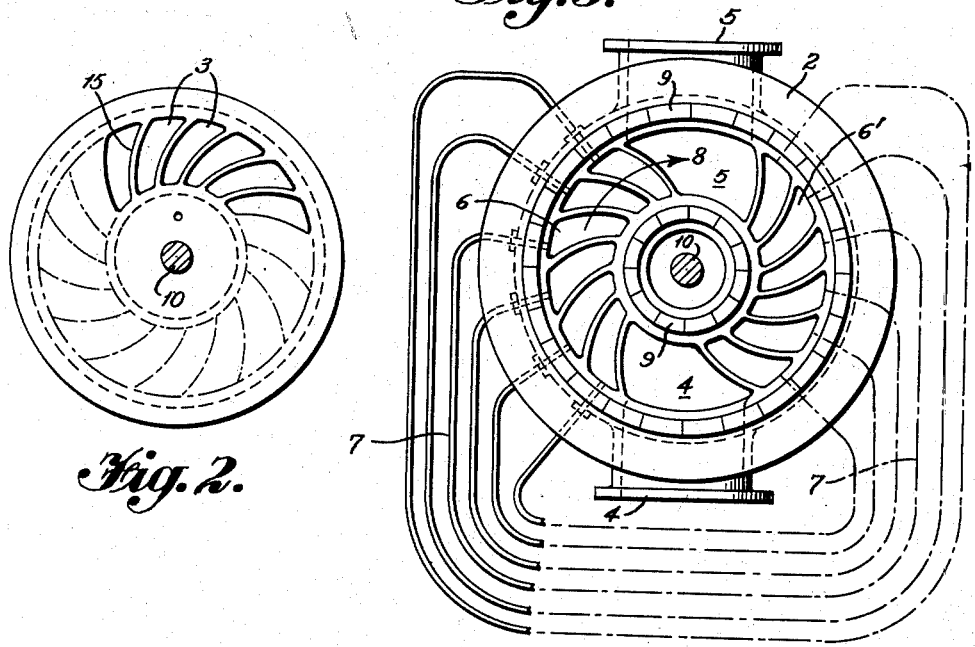
Fig. 2.
Fig. 3.
INVENTOR:
George Jendrassik
BY Stevens, Davis, Miller & Mosher
ATTORNEYS

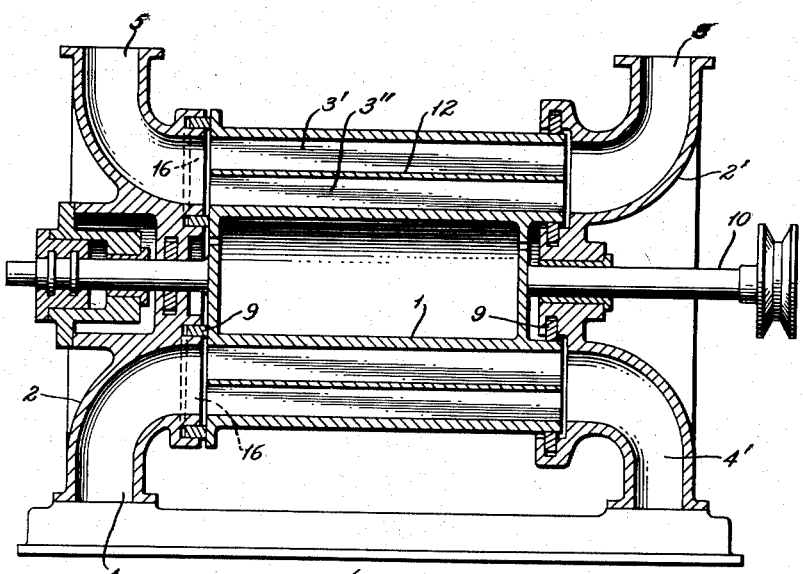
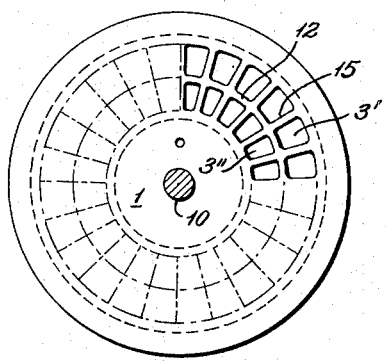
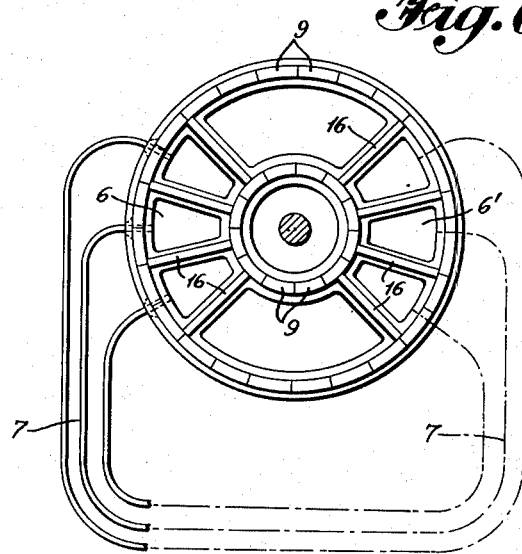

Patented Apr. 13, 1954

2,675,173

UNITED STATES PATENT OFFICE 2,675,173

APPARATUS EFFECTING PRESSURE EXCHANGE

George Jendrassik, London, England

Application February 28, 1948, Serial No. 12,103

4 Claims. (Cl. 230—69)

This invention relates to pressure exchangers, by which term is to be understood rotary machines having two inlets—for high and low pressure fluid respectively—and two outlets, and wherein compression of the lower pressure fluid supplied is accompanied by and at least in part effected by expansion of the other fluid in the same machine. One form of such machine has a rotor and a stator; a plurality of cells, in a circular series, is formed partly in the stator and partly in the rotor. One aligned pair of stator cells which communicate with each other through the rotor cells constitutes an inlet for the higher pressure fluid and an outlet for compressed fluid. Another such pair, circumferentially spaced from the first, constitutes an inlet from the lower pressure fluid and an outlet for expanded fluid.

Fluid admitted at the higher pressure through the first of the said inlets passes from the stator into a rotor cell, displacing fluid which has been compressed in that cell and which leaves by the stator outlet. At the same time, fluid admitted at the lower pressure passes from the stator into any rotor cell, displacing fluid which has expanded in that cell and which leaves by the second of the stator outlets. Rotation of the rotor relatively to the stator moves each of the said rotor cells from alignment with the said inlet and outlet stator cells and into alignment with each in turn of a number of pairs of stator cells circumferentially disposed between said inlet and outlet pairs of cells, these intermediate cells being interconnected so that the high pressure fluid in the one rotor cell is put into communication with the lower pressure fluid in the other rotor cell. Such interconnections may be of any number and in an extreme case they can be reduced to the high pressure and low pressure inlets and outlets. The former fluid will then progressively expand and the latter will be progressively compressed. When the cell containing the fluid admitted at higher pressure and now expanded comes into line with the second of the second pair of inlets and outlets it is displaced by incoming fluid at lower pressure. Similar action takes place in each of the succeeding rotor cells.

There is thus a pressure gradient around the circumference of the rotor and stator from one inlet to the other and from one outlet to the other. Rubbing seals are provided between the rotor and stator enveloping each junction of a stator with a rotor cell. According to the invention each circumferential part of these seals between the rotor and stator elements comprises a circular series of separate sealing blocks each movable in a circumferential channel in one of said elements; barriers are provided extending transversely across said channel between adjacent blocks to close up the channel against circumferential leakage. The sealing blocks may be loaded by the pressure fluid against which the seal is required to function; thus each compartment in the channel formed between the sealing elements may be loaded by the particular pressure maintained in the region adjacent to it.

The blocks may be provided with pressure compensation of the rubbing face consisting of a pressure relieving groove in the rubbing face at a position giving reduced rubbing face engagement to maintain pressure and a passage through the block for passing pressure fluid to the groove. The block may also be provided with pressure compensation of the lateral sealing face between the channel and block consisting of pressure relieving rebates between the lateral sealing faces of the block and channel leaving minimum sealing face engagement to maintain the pressure. The barriers extending transversely of the channel between the sealing blocks sealing the channel against circumferential leakage also extend across the groove and the rebates for the same purpose.

The invention will now be described by way of example only with reference to the accompanying drawings in which:

Figure 1 is a longitudinal section of a pressure exchanger with circumferential pressure gradient showing the seals between the rotor and stator members;

Figure 2 is an end view of the rotor member showing the circular series of cells;

Figure 3 is an end view of the stator member showing fluid inlet and sealing blocks;

Figure 4 is a longitudinal section of another pressure exchanger with circumferential pressure gradient;

Figure 5 is an end view of the rotor member of the pressure exchanger shown in Figure 4;

Figure 6 is an end view of the stator member of the pressure exchanger shown in Figure 4;

Figure 7:
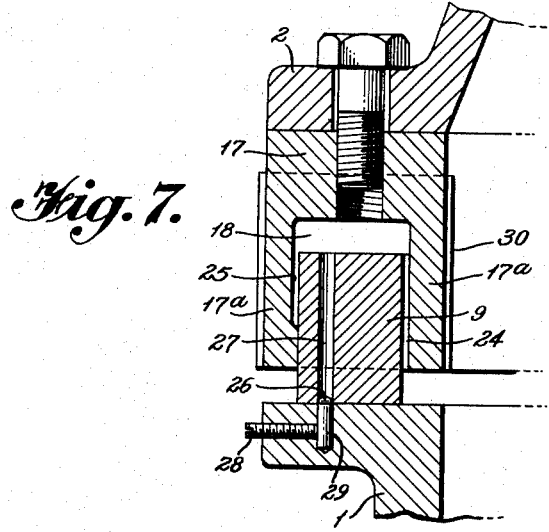
Figure 7 is a section through the seal showing sealing block and sealing element; and, Figure 8 is a plan view of the sealing block of Figure 7.

In the pressure exchanger shown in Figures 1 to 3, the cylindrical rotor member 1 is enclosed between stator members 2, $2^1$ and a cylindrical casing 13. The rotor member 1 has a plurality of axially arranged cells 3 in a circular series in which the exchange of pressure between the working fluid takes place; these cells are separated by walls 15 as seen in Figure 2.

The stator member 2 at one end of the rotor cells has a series of cells of which 4 and 5—circumferentially displaced from each other—are inlets for low and high pressure fluid respectively and 6—6' are in the form of shallow recesses separated by elevated partitions of appropriate width communicating with the rotor cell 3 and disposed between the inlet connections 4 and 5. The stator member 2' has similar cells comprising an outlet connection 4' aligned with connection 4, and outlet connection 5' aligned with inlet connection 5 and the cells 6—6' between them. The rotor cells connect together each of these pairs of stator cells. In each stator member 2, $2^1$, the reference numeral 6 indicates the cells disposed on one side of a dividing plane extending through the inlet connections 4, 5 and outlet connections $4^1$, $5^1$ (i. e. the vertical plane when considering an apparatus arranged as in Figure 3), while the reference numeral $6^1$ indicates the cells on the other side of the dividing plane. Stator cells 6, $6^1$ similarly disposed with relation to the inlet and outlet connections 4, $4^1$ and 5, $5^1$ are connected in pairs by pressure equalizing connections as pipes 7 (see Figure 3), and in this case the stator cells of stator 2 are represented as being connected to stator cell $6^1$ of stator $2^1$. The cells 6 of stator $2^1$ may, however, be connected to its own cells $6^1$, in which case stator $2^1$ need not necessarily be provided with cells 6, $6^1$.

Fresh working fluid at the lower pressure is introduced into the pressure exchanger through the inlet connection 4 of the stator member 2; fresh fluid at a higher pressure is also introduced through the inlet connection 5 of the stator member 2. During rotation of the rotor 1, the direction of which is indicated by the arrow 8, each of the rotor cells 3 is connected in turn to the inlet 4 and is filled with the fresh working fluid which dilutes and pushes out the expanded fluid that was in the cell 3 through the outlet connection 4' of the stator member 2'. During further rotation each of the cells 3 is connected in turn to the stator cells 6, $6^1$ and due to the interconnection of the stator cells 6, $6^1$ by the pipes 7, the rotor cells 3 on either side of the dividing plane are brought into connection with one another. While one of the cells 3 is being filled and scavenged with fluid from the low pressure inlet 4, another of these cells is being filled with high pressure fluid from the inlet 5. This incoming of fluid completes the compression of fluid already in that cell from the low pressure inlet and pushes out this compressed fluid through the outlet connection 5' of the stator member 2'. As this cell moves from the inlet 5 to each of the cells 6' in succession it is connected through pressure equalizing connections 7 and cells 6 with such cells 3 which are moving away from the inlet 4 after being filled with fluid at the low pressure. The rotor cell 3 moving from the high pressure inlet 5 in passing each of the stator cells 6' gives up a little of its pressure in turn to cells which have been filled with lower pressure fluid from the inlet 4. When this cell reaches the last of the cells 6' and is at a pressure only a little above its lowest it is connected through a cell 6 to a cell 3 which has been filled with fresh fluid at the incoming low pressure. This latter cell when it moves to the second of the cells 6 is connected to another cell with expanding fluid at a slightly higher pressure and so on progressively.

At each of these steps there is equalization of pressure between a rotor cell containing expanding fluid and a rotor cell containing fluid which is being compressed. In consequence of this equalization of pressures, the cells 3 moving from the high pressure inlet 5 and outlet $5^1$, towards the lower pressure inlet 4 and outlet $4^1$ will undergo a step by step decrease in pressure (i. e. the contents of those cells will expand), while the cells 3 moving from the lower pressure inlet 4 and outlet $4^1$ towards the high pressure inlet 5 and outlet $5^1$ will undergo a step by step increase of pressure (i. e. the contents of those cells will be compressed). A pressure gradient thus exists circumferentially the exchanger between the high and lower pressure fluid inlets 5, 4 and outlets $5^1$, $4^1$ in relation to ambient pressure. It is obvious from the description of the pressure exchanger that pressure losses between the cells in the circumferential direction and also between the cells and ambient pressure are important and in providing the seal between the rotor and stator to prevent such losses, care must be taken to maintain the circumferential pressure gradient in the seal itself.

The construction and operation so far described is that of one of the known forms of pressure exchanger and need not be described in more detail since the invention is concerned with the arrangement of seals therein which can be understood sufficiently from the foregoing outline of the construction of a pressure exchanger.

Figure 8:
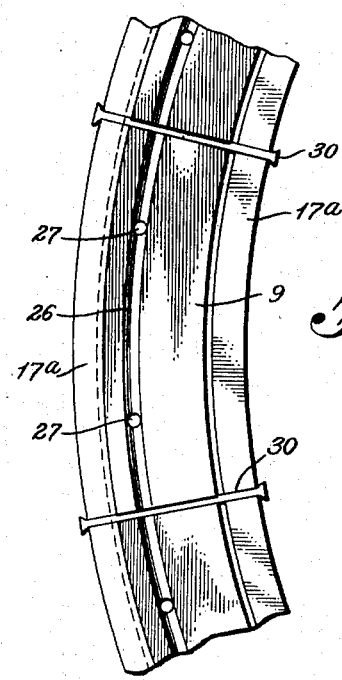

In Figure 1, the stator members 2, $2^1$ are provided with circular channels 18 in which a circular series of separate sealing blocks 9 are arranged and urged towards a face 21 on the rotor member 3. The seal is shown in greater detail in Figures 7 and 8. The blocks 9 are movable in the channel 18 in a channel ring 17 secured by screwed studs to the stator 2 or $2^1$. A passage or gap 24 is provided in each block 9 for the passage of pressure fluid to the channel 18 behind the block 9 to press it into engagement with the face 21 on the rotor member 3. In certain circumstances the area of the block 9 exposed to the fluid pressure is greater than that required to load the block 9 to maintain an effective seal against the pressure in the exchanger. In such circumstances the loading is relieved by providing a pressure relieving groove 26 in the rubbing face of the block 9 fed by pressure fluid through a passage 27. The groove 26 is arranged at a position which gives a reduced rubbing face engagement of the block 9 with the face 21 that is required to maintain the fluid pressure in the exchanger. The block 9 will also be forced laterally by the fluid pressure against the wall 17a and it may be necessary to arrange for the minimum surface area of rubbing engagement to be provided consistent with good sealing. In such circumstances a pressure relieving rebate 25 between the side wall of the block 9 and the wall 17a of the channel ring 17 is provided. The rebate 25 could be a channel similar to the channel 26 and could be supplied with pressure fluid from the passage 27.

Barriers in the form of plate pieces 30 are positioned to extend across the channel 18 between adjacent sealing blocks 9. These barriers segregate the channel into a number of individual compartments for individual blocks 9 complementary to the cells 6, 6' of the stator members 2, 2' and thus tend to prevent any communication of the fluid in the exchanger between cells at different pressures by peripheral leakage around the circumferential channel 18.

The losses through the sealing blocks 9 may be diminished by enclosing the rotor 1 in an airtight casing 13 and maintaining the space 14 at a medium pressure between the high and lower pressure at the connections 5, 5¹ and 4, 4¹ respectively. This arrangement necessitates sealing the shaft 10 with sealing rings 11 to prevent loss of the medium pressure fluid from the central hollow of the rotor 1.

In Figures 4, 5 and 6 is shown a pressure exchanger having a modified rotor 1, modified stators 2, 2¹, and at its right hand end a modified seal. The sealing blocks 9 are arranged in a radially arranged channel 18 and engage inner and outer cylindrical surfaces of the rotor 1.

The rotor 1 is modified by the insertion of a cylindrical partition 12. The object of this modification is to decrease the cross section of the cells and provide laminar flow during pressure equalization and insure that fresh and expanding fluids do not intermix very much and enable the expanding fluid to act as a free piston compressing the fresh fluid.

The modification of the stators 2, 2¹ consists of sealing blocks 16 displaceable in channels similar to the channels 18 of the blocks 9 on the dividing partitions of the cells 6 and 6¹. Although the sealing blocks 16 are shown radial in Figure 6, they can be curved.

The sealing blocks 9 are preferably made of carbonaceous material having self-lubricating properties and capable of withstanding a temperature of 600° C., such as, for example, carbon mixed with graphite talc, mica or zinc oxide or combinations thereof. The sealing blocks can be of the type used in the sealing arrangement shown in my copending application Serial No. 12,105, filed February 28, 1948, now Patent No. 2,621,946, dated December 16, 1952.

I claim:

1. A pressure exchanger comprising in combination a first and a second element mounted coaxially for relative rotation, said first element defining a series of open-ended cells extending therethrough, said second element including inlet means to allow the introduction of low pressure fluid into said cells, a second inlet means circumferentially displaced from said first means to allow the introduction of high pressure fluid into said cells and an outlet, said elements so constructed and arranged that the pressure of the low pressure fluid is raised and the pressure of the high pressure fluid is lowered in said cells during rotation of said elements which results in a pressure gradation existing circumferentially of the axis of rotation of said elements, and sealing means between said elements, sealing each cell against leakage comprising a circumferential channel formed in one of said elements, a sealing face formed in the other of said elements complemental to said channel, a circular series of separate sealing blocks movably mounted in said channel and operatively engaging said sealing face in rubbing contact therewith, and barriers extending transversely across said channel between said blocks, closing up said channel against circumferential leakage of fluid.

2. A pressure exchanger combination according to claim 1 including means to apply a fluid pressure to each of said blocks to urge said blocks into engagement with said sealing face.

3. A pressure exchanger combination according to claim 2 formed with space in said channel behind the said block, for the fluid applying pressure to the block, and with a passage from front to rear of said block, constituting a fluid passage to said space from a space in said cells wherein exists the pressure to be sealed.

4. A pressure exchanger combination according to claim 3 formed further with another passage from rear to front of said block constituting a pressure-relieving passage for fluid.

References Cited in the file of this patent

UNITED STATES PATENTS

| Number | Name | Date |
|---|---|---|
| 445,989 | Friend | Feb. 10, 1891 |
| 709,352 | Nelson | Sept. 16, 1902 |
| 1,102,473 | Chappell | July 7, 1914 |
| 1,331,360 | Parsons | Feb. 17, 1920 |
| 1,334,393 | Parsons et al. | Mar. 23, 1920 |
| 1,675,686 | Barnes | July 3, 1928 |
| 1,776,921 | Moessinger | Sept. 30, 1930 |
| 1,894,943 | Dennedy | Jan. 24, 1933 |
| 2,138,220 | Trumpler | Nov. 29, 1938 |
| 2,264,616 | Buckbee | Dec. 2, 1941 |
| 2,402,224 | Hornbostel | June 18, 1946 |

OTHER REFERENCES

Catalog of National Carbon Co., Inc., Ohio, Form C. P. 1260-5M, October 1, 1943, page 14.